United States Patent
Roters

(10) Patent No.: US 9,896,072 B2
(45) Date of Patent: Feb. 20, 2018

(54) BRAKE DEVICE AND USE OF A DIRECTION CONTROL VALVE IN A BRAKE DEVICE

(71) Applicant: WABCO GmbH, Hannover (DE)

(72) Inventor: Gerd Roters, Wunstorf (DE)

(73) Assignee: WABCO GmbH, Hannover (DE)

( * ) Notice: Subject to any disclaimer, the term of this patent is extended or adjusted under 35 U.S.C. 154(b) by 0 days.

(21) Appl. No.: 15/024,116

(22) PCT Filed: Jul. 11, 2014

(86) PCT No.: PCT/EP2014/001914
§ 371 (c)(1),
(2) Date: Mar. 23, 2016

(87) PCT Pub. No.: WO2015/043690
PCT Pub. Date: Apr. 2, 2015

(65) Prior Publication Data
US 2016/0207507 A1    Jul. 21, 2016

(30) Foreign Application Priority Data

Sep. 25, 2013  (DE) .................. 10 2013 015 971

(51) Int. Cl.
*B60T 7/12* (2006.01)
*B60T 8/32* (2006.01)
*B60T 8/171* (2006.01)

(52) U.S. Cl.
CPC .............. *B60T 7/122* (2013.01); *B60T 8/171* (2013.01); *B60T 8/32* (2013.01)

(58) Field of Classification Search
CPC . B60T 8/171; B60T 8/32; B60T 8/361; B60T 8/3655; B60T 8/5018; B60T 7/122; B60T 11/10; B60T 11/28; B60T 13/662

(Continued)

(56) References Cited

U.S. PATENT DOCUMENTS 5,538,333 A * 7/1996 Takata ............... B60T 8/38
                                                  303/113.2
2012/0217794 A1* 8/2012 Wieder .............. B60T 15/027
                                                  303/113.2
(Continued)

FOREIGN PATENT DOCUMENTS

DE      3439067 A1    5/1986
DE      4203541 A1    6/1992
(Continued)

OTHER PUBLICATIONS

European Patent Office, Rijswijk, Netherlands, International Search Report of International Application No. PCT/EP2014/001914, dated Jan. 22, 2015, 2 pages.

*Primary Examiner* — Robert A Siconolfi
*Assistant Examiner* — San Aung
(74) *Attorney, Agent, or Firm* — Brinks Gilson & Lione

(57) ABSTRACT

A brake device (10) includes a service brake valve (16) that produces an actuation-dependent pressure at a service brake valve outlet (20) when an operating means (18) is actuated. The brake device (10) includes a brake actuator (40) with a brake actuator inlet (39). The service brake valve outlet (20) is connected to the brake actuator inlet (39) via a pressure connection (14). The pressure connection (14) includes a directional control valve (24) and a check valve (30). The check valve (30) is bypassed in a first valve position of the directional control valve (24) to allow a fluid flow from the brake actuator inlet (39) to the service brake valve outlet (20) and a fluid flow through the check valve (30) from the brake actuator inlet (39) to the service brake valve outlet (20) is largely prevented in a second valve position of the directional control valve (24).

9 Claims, 1 Drawing Sheet

(58) Field of Classification Search
USPC .......................................... 303/113.1, 113.2
See application file for complete search history.

(56) References Cited

U.S. PATENT DOCUMENTS

2012/0299369 A1* 11/2012 Wieder ................... B60T 8/361
                                                                                                    303/113.1
2013/0238209 A1* 9/2013 Schaefers ............... B60T 7/122
                                                                                                    701/70

FOREIGN PATENT DOCUMENTS

| DE | 19807095 A1 | | 8/1999 |
|----|-------------|---|--------|
| EP | 331179 A1 | * | 9/1989 |
| WO | 2012/113770 A1 | | 8/2012 |

* cited by examiner

BRAKE DEVICE AND USE OF A DIRECTION CONTROL VALVE IN A BRAKE DEVICE

TECHNICAL FIELD

The invention relates to a brake device and to the use of a directional control valve in a brake device.

BACKGROUND

Various possible uses of brake devices are known in the case of which a holding function of the brake device is desired, that is to say in which, once a brake pressure has been demanded at the brake actuators by the driver by way of the brake pedal, said brake pressure should be held.

For example, in the case of a vehicle with automatic transmission, the vehicle must be held at a standstill by the driver by way of the brake pedal for as long as a drive stage is engaged, because the vehicle otherwise tends to move forward slowly.

Furthermore, in the case of a vehicle with a manual gearbox, complex interaction, which must be initiated by the driver, between handbrake, clutch and accelerator pedal is necessary in order to start off on a gradient.

In particular in the case of transport vehicles, such as for example refuse collection vehicles, or public service buses, it is furthermore the case that frequent stopping of the vehicle for short limited time durations is desired, during which, in the case of transport vehicles, the vehicle is loaded or, in the case of public service buses, passengers embark and disembark. During the holding time, the vehicle driver must continuously hold the brake pedal with the desired braking force, or must even increase the braking force if the vehicle, standing on a gradient, begins to roll in a backward direction owing to an increase in weight, for example as a result of loading.

According to the prior art, therefore, holding systems are known which maintain a brake pressure demanded by the driver by way of actuation of the brake pedal, and which, for this purpose, utilize the pressure control valves of an existing anti-lock system (ABS). If the brake pressure at the brake actuators is to be held, the pressure control valves of the ABS are closed, such that the pressure prevailing at the brake actuators continues to prevail even after the brake pedal has been released.

Such systems are however only suitable for ensuring a holding function or pressure-holding function for a limited time, because the valves permit a small fluid flow even in the closed state, and thus the pressure to be held rapidly decreases again. Furthermore, the valves are not suitable for increasing the pressure prevailing at the brake actuators. Further modifications to the brake device or brake system, in particular by way of the addition of additional pressure lines and multiple valves, are necessary for this purpose.

SUMMARY OF THE INVENTION

The invention is therefore based on the object of providing a brake device which has an inexpensive and reliable pressure-holding function and which overcomes the problems of the known solutions.

For this purpose, the invention encompasses a brake device, in particular a brake system, for a vehicle, in particular a heavy goods vehicle. The brake device has a service brake valve, wherein the service brake valve generates, in response to an actuation of an operating means, an actuation-dependent pressure at at least one service brake valve outlet. For example, by way of the operating means, the pressure is increased for as long as the operating means is further depressed, that is to say actuated. By contrast, with the operating means, the pressure is lowered again for as long as the operating means is released again. In the case of the operating means being held constant, the pressure also remains substantially constant.

Furthermore, the brake device has at least one brake actuator with a brake actuator inlet. The brake actuator is connected by way of its brake actuator inlet to the service brake valve outlet of the service brake valve via a pressure line or pressure connection. The pressure connection has at least a directional control valve and a check valve. Here, it is not ruled out that, in the various embodiments, the brake device may also include additional braking assistance systems and/or pressure-regulating elements which can shut off the connection to the pressure line.

The pressure connection with the directional control valve and the check valve is designed to bypass the check valve in a first valve position of the directional control valve. If the directional control valve is bypassed, a fluid flow from the brake actuator inlet to the service brake valve outlet is ensured. In a second valve position of the directional control valve, the pressure connection leads through the check valve, and a fluid flow from the brake actuator inlet to the service brake valve outlet is substantially prevented or blocked by the check valve.

By means of the invention, an inexpensive pressure-holding function is ensured, because only a single directional control valve and a check valve have to be additionally installed into an existing brake device or brake system. Furthermore, by means of the invention, a reliable pressure holding function is ensured which can hold a built-up pressure even over a relatively long period of time, because the check valve exhibits a significantly better blocking action in the blocking direction than ABS valves that have conventionally been used for the pressure-holding action.

In a first embodiment, the brake device with the directional control valve and the check valve is designed, that is to say the directional control valve and the check valve are integrated into the pressure connection, such that a fluid flow from the service brake valve outlet to the brake actuator inlet through the directional control valve and through the check valve is ensured regardless of the valve position of the directional control valve. Thus, in the second valve position, the check valve is integrated into the pressure connection in said flow direction, that is to say in the pass-through direction.

In this way, it is ensured in any case, that is to say when the pressure-holding function is activated and during normal operation, that, if a higher braking force is desired, the driver or vehicle driver can increase said braking force by actuating the operating means, without valve switching having to be performed.

In a further embodiment, the directional control valve has at least one directional control valve inlet and at least two directional control valve outlets, and the check valve has a check valve inlet and a check valve outlet. A first of the directional control valve outlets is directly or indirectly connected to the check valve outlet, and a second of the directional control valve outlets is directly or indirectly connected to the check valve inlet. Here, indirect refers to an immediate connection, and direct refers to the fact that, although an immediate connection exists, other components may be integrated into the connection.

By means of this embodiment, it is made possible, for the purposes of ensuring the pressure-holding function, for an existing brake system or brake device to merely be modified such that the main pressure line is interrupted at one location, and the directional control valve is connected into said interruption by way of its directional control valve inlet and by way of its first directional control valve outlet.

In a further embodiment, the first valve position of the directional control valve corresponds to a rest position assumed by the directional control valve in the deenergized and/or non-actuated state. The brake device is furthermore designed to switch the directional control valve from a holding position into the rest position when the operating means is not actuated or is released and/or when a switching means is actuated and/or when a demand for starting off is signaled.

By means of this embodiment, it is made possible for the valve position of the directional control valve to be transferred in a targeted manner into the rest position when no holding function is desired. Furthermore, the rest position is also "automatically" assumed in the deenergized situation, that is to say, if the voltage supply of the vehicle to the directional control valve is interrupted or defective, the normal braking function of the vehicle is ensured.

In a further embodiment, the second valve position of the directional control valve corresponds to the holding position assumed by the directional control valve in the energized and/or actuated state. The brake device is furthermore designed to switch the directional control valve from the rest position into the holding position when the vehicle is at a standstill and when the operating means and/or a switching means are/is actuated.

By means of this embodiment, it is ensured that the holding function or the pressure-holding function can be activated only when the vehicle is at a standstill, this being detected for example by an electronic control unit (ECU) with sensors connected thereto. The holding function accordingly cannot be activated during normal travel, because in such a situation, this could lead to the vehicle being undesirably brought to a standstill if the holding function were inadvertently activated.

In a further embodiment, the operating means is a brake pedal. In this way, an activation of the holding or pressure-holding function is possible using a component which is already provided in every vehicle, specifically the brake pedal, without the need for further components, such as switches or levers, to be added to the vehicle.

In a further embodiment, the service brake valve outlet is connected to the directional control valve inlet directly or indirectly via the pressure connection or the pressure line. By means of such a connection, it is made possible for the pressure generated at the service brake valve outlet to always also prevail at the directional control valve inlet.

In a further embodiment, the first directional control valve outlet and the check valve outlet are connectable indirectly or directly to the brake actuator inlet or to the brake actuator inlets. Therefore, the pressure provided at the outlet side by the directional control valve and by the check valve is also provided at the, or all of the, brake actuators.

In a further embodiment, the brake device has a pressure sensor which is arranged in the pressure connection between the service brake valve outlet and the directional control valve inlet. Said pressure sensor is used for example to detect whether, when the holding or pressure function is activated, the operating means, such as for example the brake pedal, is released. In this case, a deactivation of the holding or pressure function takes place for example "automatically", that is to say without further action on the part of the driver. The directional control valve is thus transferred into its rest position or first valve position again.

Furthermore, the invention encompasses the use of a directional control valve and of a check valve in a brake device for a vehicle. The brake device has a service brake valve which is designed to generate, in response to an actuation of an operating means, an actuation-dependent pressure at at least one service brake valve outlet. Furthermore, the brake device has at least one brake actuator with a brake actuator inlet. The brake device thus has one or more brake actuators, each of which has a brake actuator inlet.

The service brake valve outlet is connectable to the brake actuator inlet by way of a pressure connection, wherein the pressure connection has at least the directional control valve and the check valve. The directional control valve and the check valve are used in the pressure connection such that the pressure connection is designed to bypass the check valve when the directional control valve is in a first valve position. A fluid flow from the brake actuator inlet to the service brake valve outlet can thus be ensured. Furthermore, the pressure connection is designed such that, when the directional control valve is in a second valve position, a fluid flow through the check valve from the brake actuator inlet to the service brake valve outlet is substantially prevented. For this purpose, the directional control valve is integrated, reversed in the otherwise conventional manner, into the pressure connection or pressure line.

Through the use of the directional control valve and of the check valve in a brake system or brake device, it is the case in particular that an inexpensive pressure-holding function is ensured, because only a single directional control valve and a check valve have to be additionally installed into an existing brake device or brake system.

Further embodiments of the invention will emerge from the exemplary embodiments, which will be discussed in more detail on the basis of the drawings.

DETAILED DESCRIPTION OF THE DRAWINGS

The drawings are provided herewith for purely illustrative purposes and are not intended to limit the scope of the present invention.

Figure 1:
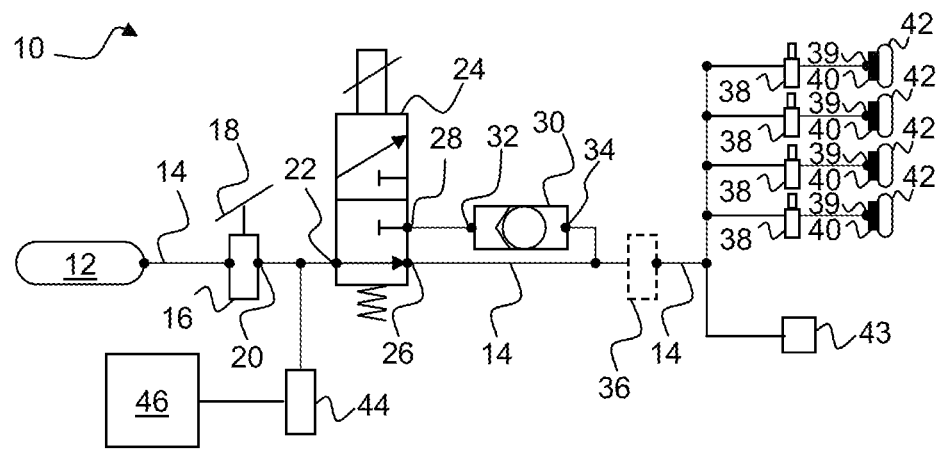
FIG. 1 shows an exemplary embodiment of a brake device during normal braking operation.

FIG. 1 shows an exemplary embodiment of a brake device 10. The brake device 10 has a pressure reservoir 12. The pressure reservoir 12 corresponds to a vessel in which, for example, air or brake fluid is made available at a predefined pressure. In the case of a compressed-air reservoir 12, this is fed for example by a compressor (not illustrated). The pressure reservoir 12 is connected to a service brake valve 16 via a pressure connection or pressure line 14. The service brake valve 16 is designed such that, as a result of actuation of an operating means 18, which in this case is in the form of a brake pedal, an actuation-dependent pressure is made available at a service brake valve outlet 20. This means that the pressure made available by the pressure reservoir 12 is made available at the service brake valve outlet 20 in a manner dependent on the degree of opening of the service brake valve 16, with said degree being set by way of the operating means 18.

The service brake valve outlet 20 is furthermore connected, by way of the pressure line 14, to a directional control valve inlet 22 of a directional control valve 24. In this exemplary embodiment, the directional control valve 24 is a 3/2 directional control valve, which is open when in the rest position. The 3/2 directional control valve is however integrated into the pressure line 14 in the reverse direction, such that, in the present case, it has a first directional control valve outlet 26 and a second directional control valve outlet 28. Furthermore, the brake device 10 has a check valve 30 which has a check valve inlet 32 and a check valve outlet 34.

The check valve outlet 34 is connected to the first directional control valve outlet 26. The check valve is designed so as to permit the flow of a fluid from the check valve inlet 32 to the check valve outlet 34, such that said direction corresponds to a pass-through direction. The flow of a fluid from the check valve outlet 34 to the check valve inlet 32 is however prevented by the check valve 30, wherein said flow direction thus corresponds to the blocking direction of the check valve 30.

The first directional control valve outlet 26 and the check valve outlet 34, that is to say the connection of the first directional control valve outlet 26 and of the check valve outlet 34, are furthermore connected by way of the pressure connection or pressure line 14, and via further components 36 of the brake device and anti-lock system valve 38, to brake actuator inlets 39 of brake actuators 40. The brake actuators 40 are arranged in the region of the vehicle wheels 42 in order to be able to brake said vehicle wheels by way of further constituent parts (not illustrated) of a conventional brake system.

Furthermore, the first directional control valve outlet 26 and the check valve outlet 34, that is to say the connection of the first directional control valve outlet 26 and of the check valve outlet 34, are additionally furthermore connected by way of the pressure connection or pressure line 14, and via further components 36, to a pressure port 43. A brake system or a brake circuit of a vehicle trailer can be connected to said pressure port 43.

By way of the pressure port 43, the special feature is realized whereby the directional control valve 24 and the check valve 30 can act on two brake circuits, specifically for example on the brake circuit of a rear axle of the tractor vehicle and on the brake circuit of the vehicle trailer. This yields the advantage that, using a single directional control valve 24 and a single check valve 30, a tractor vehicle and a trailer or vehicle trailer can be uniformly braked and thus the holding function or pressure holding function can be utilized for the vehicle trailer, without additional modifications to the brake circuit of the vehicle trailer.

Furthermore, the brake device has a pressure sensor 44 which measures the pressure made available by the service brake valve 16 at its service brake valve outlet 20. The pressure sensor 44 is electrically connected to an electronic control unit (ECU) 46 in order to transmit to the ECU 46 the pressure made available. The ECU 46 is furthermore connected to the directional control valve 24 and to the anti-lock system valves 38, wherein said connection is not illustrated here for the purposes of better clarity. The ECU 34 controls the valve position of the directional control valve 24. Furthermore, the ECU 46 is connected to further sensors by means of which, for example, a standstill situation of the vehicle can be detected.

In the illustrated first valve position of the directional control valve 24, which corresponds to a rest position, a holding function or pressure-holding function is deactivated. The vehicle wheels 42 are thus in motion, wherein said motion is detected by the ECU 46 and the directional control valve 24 is therefore not actuated. A fluid can thus flow from the service brake valve outlet 20 to the brake actuators 40 and to the pressure port 43 or in the reverse direction. Normal braking while the vehicle is travelling is thus ensured.

Figure 2:
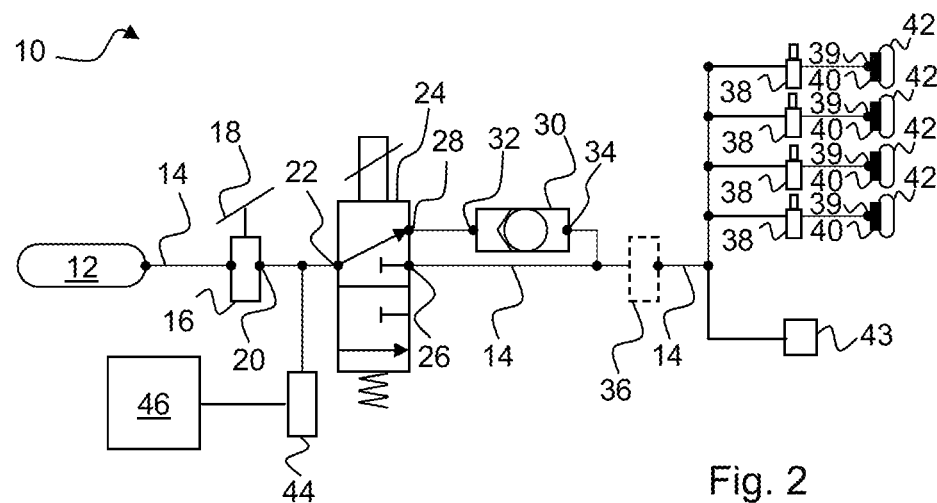
FIG. 2 shows an exemplary embodiment of a brake device with activated holding or pressure-holding function.

FIG. 2 shows a situation in which the directional control valve 24 has been switched or transferred into its second valve position. The same reference numerals as in FIG. 1 are used in FIG. 2 to denote identical features. Said valve position corresponds to a holding or pressure-holding position, in which the holding or pressure-holding function is thus activated.

The second valve position of the directional control valve 24 has been assumed by virtue of the directional control valve 24 being actuated by the ECU 46. In said position, an actuation of the operating means 18 has been measured by the ECU 46 by way of the pressure sensor 44, and the standstill situation of the vehicle wheels 42 has been detected by the ECU 46, such that the ECU 46 has actuated the directional control valve 24.

In said second directional control valve position, a fluid can flow from the service brake valve outlet 20 to the brake actuators 40 and to the pressure port 43, wherein the flow in the reverse direction is blocked by the check valve. Therefore, it is possible for the brake pressure at the brake actuators 40 to be held or increased, wherein a lowering of the brake pressure takes place again only when the directional control valve 24 switches back into its first valve position. This takes place for example when the operating means 18 is completely released, that is to say is no longer operated by the driver, because the ECU 46 detects said release by way of the pressure sensor 44.

Furthermore, in a further exemplary embodiment which is not illustrated here, a switch is provided which is connected to the ECU 46. An activated holding function is deactivated only by actuation of the switch, wherein for this purpose, the ECU 46 thus switches the directional control valve 24 into the first valve position again only as a result of actuation of the switch. In a further exemplary embodiment which is likewise not illustrated here, a sensor is connected to the ECU 46, which sensor can detect a demand for starting off, for example from an actuation of an accelerator pedal, and the ECU 46 switches the directional control valve 24 into the first valve position again only when a demand for starting off is signaled to the ECU by the sensor.

While the above description constitutes the preferred embodiments of the present invention, it will be appreciated that the invention is susceptible to modification, variation and change without departing from the proper scope and fair meaning of the accompanying claims.

The invention claimed is:

1. A brake device (10) for a vehicle, comprising:
a service brake valve (16) configured to generate, in response to an actuation of an operating element (18), an actuation-dependent pneumatic pressure at at least one service brake valve outlet (20),
at least one brake actuator (40) with a brake actuator inlet (39), wherein the service brake valve outlet (20) is configured to be connected to the brake actuator inlet (39) by way of a pressure connection (14), the pressure connection (14) having at least a directional control valve (24) and a check valve (30), the pressure connection (14) having a first valve position of the directional control valve (24), in which the pressure connection (14) bypasses the check valve (30), thereby establishing a fluid flow from the pressure connection downstream of the check valve (30) to the service brake valve outlet (20), and a second valve position of the directional control valve (24), in which the fluid flow through the check valve (30) the pressure connection downstream of the check valve (30) to the service brake valve outlet (20) is blocked, wherein the directional control valve (24) and the check valve (30) are configured to ensure a fluid flow from the service brake valve outlet (20) to the pressure connection downstream of the check valve (30) in both the first valve position and the second valve position of the directional control valve (24).

2. The brake device as claimed in claim 1, wherein the directional control valve (24) has at least one directional control valve inlet (22) and at least two directional control valve outlets (26, 28), and the check valve (30) has a check valve inlet (32) and a check valve outlet (34), wherein a first of the directional control valve outlets (26) is directly or indirectly connected to the check valve outlet (34), and a second of the directional control valve outlets (28) is directly or indirectly connected to the check valve inlet (32).

3. The brake device as claimed in claim 1, wherein the first valve position of the directional control valve (24) corresponds to a rest position assumed by the directional control valve (24) in a deenergized state, wherein the brake device (10) is configured to switch the directional control valve (24) from a holding position into the rest position when at least one of the following conditions is met: the operating element (18) is not actuated; the operating element (18) is released; a deactivating switching element is actuated; or a demand for driving off is signaled.

4. The brake device as claimed in claim 3, wherein the directional control valve (24) has a second valve position that corresponds to the holding position assumed by the directional control valve (24) in the energized state, and the brake device (10) is designed to switch the directional control valve (24) from the rest position into the holding position when the vehicle is at a standstill and when at least one of the operating element (18) or an activating switching element is actuated.

5. The brake device as claimed in claim 1, wherein the operating element (18) is a brake pedal.

6. The brake device as claimed in claim 2, wherein the service brake valve outlet (20) is configured to be connected to the directional control valve inlet (22).

7. The brake device as claimed in claim 2, wherein the first directional control valve outlet (26) and the check valve outlet (34) are configured to be connected to the brake actuator inlet (39).

8. The brake device as claimed in claim 2, wherein the brake device (10) has a pressure sensor (44) which is arranged in the pressure connection (14) between the service brake valve outlet (20) and the directional control valve inlet (22).

9. The brake device as claimed in claim 6, wherein the service brake valve outlet (20) is configured to be connected to the directional control valve inlet indirectly via the pressure connection (14).

* * * * *